(12) United States Patent
Cai et al.

(10) Patent No.: US 8,709,127 B2
(45) Date of Patent: Apr. 29, 2014

(54) POROUS DENDRITIC PLATINUM TUBES AS FUEL CELL ELECTROCATALYSTS

(75) Inventors: Mei Cai, Bloomfield Hills, MI (US); Xueliang Sun, London (CA); Gaixia Zhang, London (CA); Shuhui Sun, London (CA); Ruying Li, London (CA)

(73) Assignees: GM Global Technology Operations LLC, Detroit, MI (US); The University of Western Ontario, London, Ontario (CA)

( * ) Notice: Subject to any disclaimer, the term of this patent is extended or adjusted under 35 U.S.C. 154(b) by 271 days.

(21) Appl. No.: 13/232,016

(22) Filed: Sep. 14, 2011

(65) Prior Publication Data

US 2012/0003563 A1 Jan. 5, 2012

Related U.S. Application Data

(63) Continuation-in-part of application No. 12/704,786, filed on Feb. 12, 2010.

(51) Int. Cl.
 *B22F 9/24* (2006.01)
 *B82Y 40/00* (2011.01)

(52) U.S. Cl.
 USPC ................. 75/372; 75/732; 977/899

(58) Field of Classification Search
 None
 See application file for complete search history.

(56) References Cited

U.S. PATENT DOCUMENTS

| | | | | |
|---|---|---|---|---|
| 7,374,599 | B1 * | 5/2008 | Shelnutt et al. | 75/370 |
| 2007/0212591 | A1 * | 9/2007 | Miyazaki et al. | 429/40 |
| 2012/0034550 | A1 * | 2/2012 | Xia et al. | 429/524 |

OTHER PUBLICATIONS

Lan Yun Chang, Amanda S. Barnard, Lionel Cervera Gontard, & Rafal E. Dunin-Borkowski, Resolving the Structure of Active Sites on Platinum Catalytic Nanoparticles, Nano Letters, Jul. 28, 2010, 3073-3076, 10, American Chemical Society, US.

Chun-Hua Cui, Hui-Hui Li, & Shu-Hong Yu, A general approach to electrochemical deposition of high quality free-standing noble metal (Pd, Pt, Au, Ag) sub-micron tubes composed of nanoparticles in polar aprotic solvent, Chemical Communications, Dec. 10, 2009, 940-942, 46, Royal Society of Chemistry, US.

Yugang Sun, Brian Mayers, & Younan Xia, Metal Nanostructures with Hollow Interiors, Advanced Materials, Apr. 9, 2003, 641-646, 15, Wiley-VCH Verlag GmbH & Co. KGaA, US.

Yingpu Bi & Gongxuan Lu, Facile Synthesis of Platinum Nanofiber/Nanotube Junction Structures at Room Temperature, Chemistry of Materials, Jan. 16, 2008, 1224-1226, 20, American Chemical Society, US.

Yingpu Bi & Gongxuan Lu, Control growth of uniform platinum nanotubes and their catalytic properties for methanol electrooxidation, Electrochemistry Communications, Nov. 1, 2008, 45-49, 11, Elsevier B.V., US.

Zhongwei Chen, Mahesh Waje, Wenzhen Li, & Yushan Yan, Supportless Pt and PtPd Nanotubes as Electrocatalysts for Oxygen-Reduction Reactions, Angewandte Chemie International Edition, May 2, 2007, 4060-4063, 46, Wiley-VCH Verlag GmbH & Co. KGaA, US.

(Continued)

*Primary Examiner* — George Wyszomierski
(74) *Attorney, Agent, or Firm* — Reising Ethington P.C.

(57) ABSTRACT

Platinum particles have been formed as porous, hollow tubular dendrites by using silver dendrite particles in a galvanic replacement reaction conducted in an aqueous solution of a platinum compound. The dendritic platinum particles have been found useful as catalysts and particularly useful as a hydrogen-oxidation electrocatalyst and/or an oxygen-reduction catalyst in a polymer electrolyte membrane fuel cell.

8 Claims, 8 Drawing Sheets

(56) References Cited

OTHER PUBLICATIONS

Hai-Wei Liang, Xiang Cao, Fei Zhou, Chun-Hua Cui, Wen-Jun Zhang, & Shu-Hong Yu, A Free-Standing Pt-Nanowire Membrane as a Highly Stable Electrocatalyst for the Oxygen Reduction Reaction, Advanced Materials, Feb. 4, 2011, 1467-1471, 23, Wiley-VCH Verlag GmbH & Co. KGaA, US.

Shaun M. Alia, Gang Zhang, David Kisailus, Dongsheng Li, Shuang Gu, Kurt Jensen, & Yushan Yan, Porous Platinum Nanotubes for Oxygen Reduction and Methanol Oxidation Reactions, Advanced Functional Materials, Oct. 1, 2010, 3742-3746, 20, Wiley-VCH Verlag GmbH & Co. KGaA, US.

Kallum Koczkur, Qingfeng Yi, & Aicheng Chen, Nanoporous Pt-Ru Networks and Their Electrocatalytical Properties, Advanced Materials, Aug. 21, 2007, 2648-2652, 19, Wiley-VCH Verlag GmbH & Co. KGaA, US.

Azusa Takai, Yusuke Yamauchi, & Kazuyuki Kuroda, Fabrication of mesoporous Pt nanotubes utilizing dual templates under a reduced pressure condition, Chemical Communications, May 8, 2008, 4171-4173, 35, Royal Society of Chemistry, US.

Tsuyoshi Kijima, Takumi Yoshimura, Masafumi Uota, Takayuki Ikeda, Daisuke Fujikawa, Shinji Mouri, & Shinji Uoyama, Noble-Metal Nanotubes (Pt, Pd, Ag) from Lyotropic Mixed-Surfactant Liquid-Crystal Templates, Angewandte Chemie, Dec. 19, 2003, 230-234, 116, Wiley-VCH Verlag GmbH & Co. KGaA, US.

\* cited by examiner

POROUS DENDRITIC PLATINUM TUBES AS FUEL CELL ELECTROCATALYSTS

This application is a continuation-in-part of our co-pending application, U.S. patent application Ser. No. 12/704,786, filed Feb. 12, 2010.

TECHNICAL FIELD

This invention pertains to making porous, hollow, dendritic platinum tubes using dendritic crystals of silver as templates. Further, the new hollow, porous, dendritic platinum crystals are found to serve, for example, as durable electrode catalysts for both hydrogen oxidation and oxygen reduction in proton exchange membrane (PEM) fuel cells. The porous dendritic platinum tubes may be advantageously used in such fuel cell electrodes without being dispersed on carbon support particles.

BACKGROUND OF THE INVENTION

Fuel cells are electrochemical devices that are being developed for automotive and stationary electric power generation. One fuel cell design uses a solid polymer electrolyte (SPE) membrane or proton exchange membrane (PEM), to provide ion transport between a fuel supply electrode and an oxygen electrode of each cell. Gaseous and liquid fuels capable of providing protons are used. Examples include hydrogen and methanol, with hydrogen being favored. Hydrogen is supplied to the fuel cell's anode. Oxygen (as air) is the cell oxidant and is supplied to the cell's cathode. In present designs the electrodes are formed of porous conductive materials, such as woven graphite, graphitized sheets, or carbon paper to enable the fuel to disperse over the surface of the membrane facing the fuel supply electrode. Each electrode has finely divided catalyst particles (for example, platinum particles), supported on carbon particles, to promote ionization of hydrogen at the anode and reduction of oxygen at the cathode. Protons flow from the anode through the ionically conductive polymer membrane to the cathode where they combine with oxygen to form water, which is discharged from the cell. Conductor plates carry away the electrons formed at the anode.

Currently, state of the art PEM fuel cells utilize a membrane made of one or more perfluorinated ionomers such as DuPont's Nafion®. The ionomer carries pendant ionizable groups (e.g. sulfonate groups) for transport of protons through the membrane from the anode to the cathode.

A significant problem hindering the large-scale implementation of fuel cell technology is the loss of electrode performance during extended operation, the cycling of power demand during normal automotive vehicle operation as well as vehicle shut-down/start-up cycling. This invention is based in part on the recognition that a considerable part of the performance loss of PEM fuel cells is associated with the degradation of the oxygen reduction electrode catalyst. This degradation is probably caused by a combination of mechanisms that alter the characteristics of the originally prepared catalyst and its support. Likely mechanisms include growth of platinum particles, dissolution of platinum particles, bulk platinum oxide formation, and corrosion of the carbon support material. Indeed, carbon has been found to corrode severely at electrical potentials above 1.2 volts and the addition of platinum particles onto the surface of the carbon increases the corrosion rate of carbon considerably at potentials below 1.2 volts. These processes lead to a loss in active surface area of the platinum catalyst that leads to loss in oxygen electrode performance.

It is desirable to provide a more effective and durable catalyst and catalyst support combination for use in electrodes of fuel cells.

This invention uses practices disclosed in our above-identified, co-pending application U.S. application Ser. No. 12/704,786, filed Feb. 12, 2010.

SUMMARY OF THE INVENTION

In preferred embodiments of our invention small porous dendritic platinum tubes are prepared by a galvanic replacement reaction between small, substantially pure silver dendrite particles and an aqueous solution of a platinum salt, such as substantially pure hexachloroplatinic acid, $H_2PtCl_6$. The resulting small, porous, dendritic platinum tubes have a hierarchical structure of main trunks (or stems), branches, sub branches, and leaves. The connected parts of the dendritic structure are hollow (like many branched tubes) and porous, and formed of many small nanometer-size particulate elements. It is believed that the unusual and novel structure of these dendritic platinum particulate tubes results from their formation by the replacement reaction using silver dendrite particles as the sacrificial reactant material.

The silver dendrites used in the replacement reaction have dimensions of about a micron or so across the width of their dendritic branches. The silver particles are mixed with the aqueous solution of substantially pure hexachloroplatinic acid in which there is a stoichiometric excess of platinum with respect to the amount of silver dendrite particles. In this aqueous mixture, the silver has a higher electrochemical reduction potential than the platinum in its dissolved compound, and the silver in the dendritic particles reacts with the platinum ions in solution to chemically reduce and precipitate a portion of the platinum content of the solution. This reduction reaction proceeds at a typical temperature range of about −2° to about 25° C. While the mixture may be heated in promoting the reduction reaction, heating is not necessary.

The dendritic silver particles, thus dispersed in the aqueous solution of a stoichiometric excess of platinum ions, react with dissolved platinum with the result that the silver particles are entirely dissolved and pure, small, dendritic platinum tubes are formed. The platinum dendritic tubes are separated from the aqueous solution and washed clean of any silver-containing residue. In this reaction the precipitated platinum particles form as small dendritic tubes, somewhat like the shapes of the silver particles added to the platinum solution.

The dendritic silver particles, which served as templates for the precipitated platinum particles, were also formed from an aqueous silver nitrate solution (at a temperature below 10° C.) using commercial, pure magnesium powder (−100+200 mesh) as the galvanic reduction reactant. An excess of silver was used for complete removal of the magnesium and corresponding deposit of substantially pure silver. After standing for a few hours, the magnesium powder was oxidized and completely dissolved in the aqueous solution as it chemically reduced silver ions to silver metal which (unlike the magnesium powder precursor material) formed dendritic single crystals with characteristic trunks, branches, sub-branches, and leaves. In other embodiments of the invention, aluminum, manganese, or zinc powder may be used in place of the magnesium powder in forming the dendritic silver template particles.

Careful microscopic analysis of the platinum particles reveals that they are generally characterized by a long hollow central trunk with shorter hollow side branches (and some sub-branches) of small porous leaves. Generally the lengths of the trunks and branches of the silver template crystals are several tens of micrometers and several micrometers, respectively. The diameters of the trunks, branches, and leaves were about 40 nanometers. Scanning electron microscope images of the platinum particles revealed similar dendrite structures with slightly larger diameters of the leaves and branches. But the platinum dendrites are found to be hollow, porous tube structures formed of many assembled platinum particles of about two to three nanometers in largest dimension (nanoparticles).

The platinum dendritic tubes were evaluated electrochemically and found to serve well in challenging electrochemical applications such as in the hydrogen-oxidation electrode and in the oxygen-reduction electrode of a PEM fuel cell. Compared to the most widely used commercial PEM fuel cell catalyst that is made of Pt nanoparticles supported on amorphous carbon-particle aggregates, the porous, hollow Pt dendritic tubes, made by process embodiments of this invention, exhibit much improved electrocatalytic activity and durability as seen in the following main factors: 1) they do not require carbon support particles, eliminating the carbon corrosion problem that potentially results in degradation of at least the oxygen-reduction electrode of PEM cells; 2) the platinum dendritic tubes display a hierarchical structure, with stronger mechanical properties, and are less vulnerable to dissolution and aggregation; 3) their hollow dendritic tubular structure, with a high concentration of edges and terraces, provide surfaces for high catalytic activity; 4) their porous, hollow and hierarchical structure also provides high surface area with high catalytic activity points; and 5) the dendritic platinum tubes exhibit very high and useful specific activity for the oxygen reduction reaction (ORR) required in hydrogen-oxygen (air) PEM fuel cells.

Other objects and embodiments of our invention will be apparent from a detailed description of preferred embodiments which follows in this specification. Reference will be made to drawing figures which are described in the following section of the specification.

BRIEF DESCRIPTION OF THE DRAWINGS

In FIG. 4A the dimensional line represents 100 nanometers.

FIG. 6A is a graph of Current (mA) versus Potential (V vs. Reference Hydrogen Electrode) for each of Pt dendrite tubes (short dashed line), commercial platinum particles (Pt black, dash-dot-dot line), and a commercial platinum on carbon support material (E TEK, solid line).

FIG. 6B is a graph of hydroxyl surface coverage ($\Theta_{OH}$) for Pt dendritic tubes (dashed line), platinum black particles (dash-dot-dot line), and Pt/C (E-TEK, solid line curve) catalysts.

FIG. 6C is a graph presenting polarization curves for ORR of Pt dendritic tubes (dashed line curve), platinum black particles (dash-dot-dot line), and Pt/C (E-TEK, solid line curve) catalysts in $O_2$-saturated 0.5 M $H_2SO_4$ solution at room temperature (1600 rpm, sweep rate 10 mV/s).

FIG. 6D is a bar graph of mass activity (MA) and specific activity (SA) at 0.9 V (vs. RHE) for the three catalysts.

FIG. 7A is graph of CV curves [Current (mA) versus Potential (V vs. Reference Hydrogen Electrode)] for Pt/C (E-TEK) catalysts at the initial cycle (dash line curve) and after 4,000 cycles (solid line curve). FIG. 7B is a graph of like curves for platinum black (Pt Black) at an initial cycle (dash line curve) and after 4000 cycles (solid line curve). FIG. 7C is a graph of like CV curves of Pt dendritic tube without a carbon support at an initial cycle (dash line curve) and after 4,000 cycles (solid line curve). And FIG. 7D is a graph of loss of electrochemical surface area (ECSA) of Pt dendritic tubes (filled circle data points), platinum black (star data points) and Pt/C (E-TEK, filled square data points) catalysts as a function of cycling numbers in $O_2$-purged 0.5 M $H_2SO_4$ solution at room temperature (0.6-1.2 V vs. RHE, sweep rate 50 mV/s).

DESCRIPTION OF PREFERRED EMBODIMENTS

Many United States patents assigned to the assignee of this invention describe electrochemical fuel cell assemblies having an assembly of a solid polymer electrolyte membrane and electrode assembly. For example, FIGS. 1-4 of U.S. Pat. No. 6,277,513 include such a description, and the specification and drawings of that patent are incorporated into this specification by reference.

Figure 1:
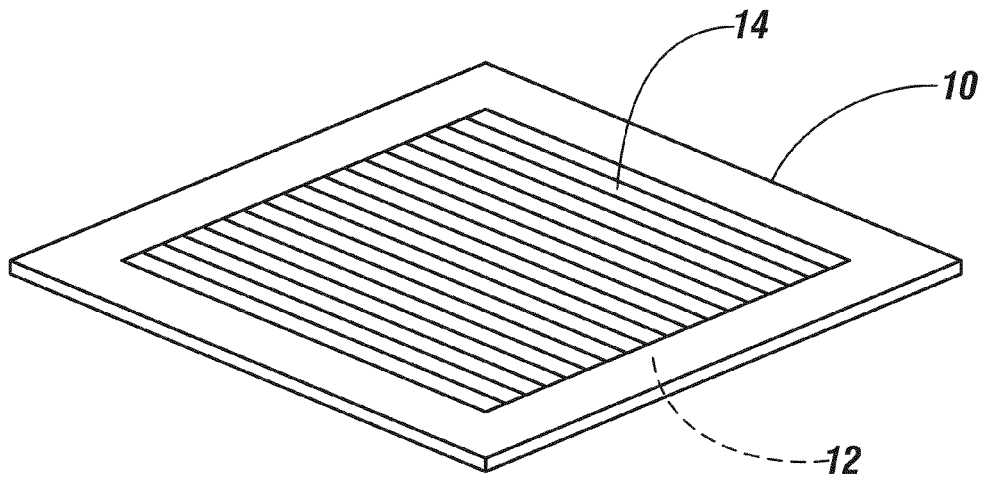
FIG. 1 is a schematic view of a combination of solid polymer membrane electrolyte and electrode assembly (MEA) used in each cell of an assembled fuel cell stack.

FIG. 1 of this application illustrates a membrane electrode assembly 10 which is a part of the electrochemical cell illustrated in FIG. 1 of the '513 patent. Referring to FIG. 1 of this specification, membrane electrode assembly 10 includes anode 12 and cathode 14. In a hydrogen/oxygen (air) fuel cell, for example, hydrogen is oxidized to H+ (proton) at the anode 12 and oxygen is reduced to water at the cathode 14.

Figure 2:
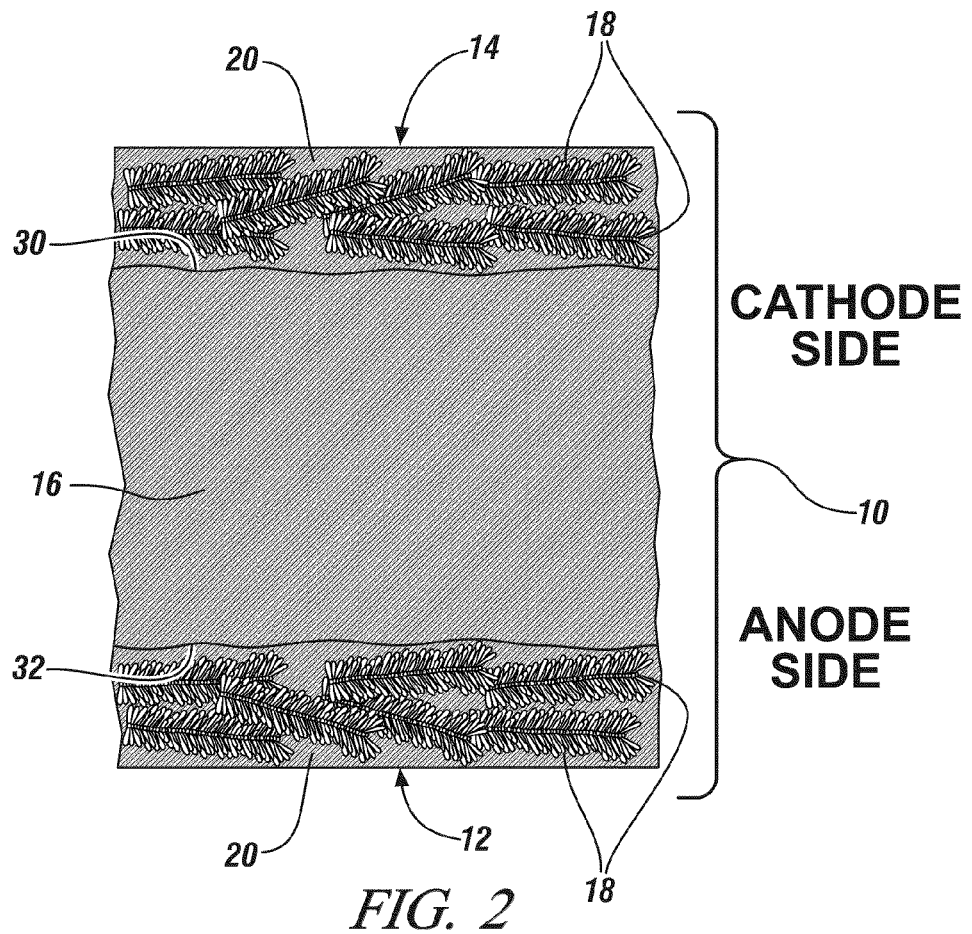
FIG. 2 is an enlarged, schematic, fragmentary cross-section of the MEA of FIG. 1.

FIG. 2 provides a greatly enlarged, schematic, fragmented, cross-sectional view of the membrane electrode assembly 10 shown in FIG. 1. In FIG. 2, anode 12 and cathode 14 are applied to opposite sides (sides 32, 30 respectively) of a proton exchange membrane 16. PEM 16 is suitably a membrane made of a perfluorinated ionomer such as DuPont's Nafion®. The ionomer molecules of the membrane carry pendant ionizable groups (e.g. sulfonate groups) for transport of protons through the membrane from the anode 12 applied to the bottom surface 32 of the membrane 16 (in this figure) to the cathode 14 which is applied to the top surface 30 of the membrane 16. In an exemplary cell, the polymer electrolyte membrane 16 may have dimensions of 100 mm by 100 mm by 0.05 mm. As will be described, the anode 12 and cathode 14 are both thin, porous electrode members prepared from inks and applied directly to the opposite surfaces 30, 32 of the PEM 16 through decals.

In accordance with this invention, cathode 14 suitably includes the hollow, porous dendritic platinum particles 18 of this invention. The dendritic platinum particles may be embedded in a suitable bonding material 20. In this embodiment, the bonding material 20 is suitably a perfluorinated ionomer material like the polymer electrolyte membrane 16 material. The dendritic platinum particles provide both the electrochemical activity for oxygen reduction and they are in suitable contact to provide the electrical conductivity required in and through the electrode material.

A formulated mixture of dendritic platinum particles 18 and particles of the electrode bonding material 20 is suspended in a suitable volatile liquid vehicle and applied to surface 30 of proton exchange membrane 16. The vehicle is removed by vaporization and the dried cathode 14 material further pressed and baked into surface 30 of PEM 16 to form cathode 16.

In the FIG. 2 embodiment of the invention, the anode 12 is constructed of the same materials as cathode 14. But anode 12 may alternatively employ the commonly used platinum particles dispersed on carbon support particles as the electrode material.

As stated above, dendritic platinum particles have been prepared by a galvanic replacement reaction and found to be useful as durable electrocatalysts for the above illustrated proton exchange membrane structures. In accordance with the preparation of the dendritic platinum particles and their precursor materials substantially pure starting materials may be used to assure the formation of unadulterated products, and such materials were used in the following examples.

Doubly distilled deionized (DI) water was used for all preparations. Silver nitrate ($AgNO_3$, 99.95%) and hexachloroplatinic acid ($H_2PtCl_6 \cdot 6H_2O$, 99.95%) were obtained from Sigma-Aldrich and used as received. The magnesium metal powder (Mg, −100+200 mesh, 99.6%) was obtained from Alfa Aesar.

A freshly prepared $AgNO_3$ aqueous solution (0.03M, 17 ml) was added to a glass vial that contained a predetermined amount (5.3 mg) of commercially available Mg powder. The magnesium powder particles were generally spherical in shape. The atomic concentration of $Ag^+$ in this replacement reaction was over two times greater than that of Mg so that the Mg would be completely oxidized to $Mg^{2+}$, precipitating Ag dendrites only. The reactions were conducted in glass vials (20 ml) at 2-25° C. in ambient atmosphere for up to several minutes. The temperature was controlled by a constant temperature bath (VWR model 1162A). After the reduction reactions were complete, the products were washed several times in DI water, collected by filtration and then dried in a vacuum oven overnight. While the silver particles were dendritic, they were not hollow.

Dendritic particles of silver were then used in the formation of porous, dendritic platinum tubes. This second galvanic replacement reaction was conducted at room temperature using 47 mg of dendritic silver particles and $H_2PtCl_6$ solution (0.006 M, 28 ml) in a glass container open to the ambient atmosphere. The reactants were allowed to stand for up to several hours until the solution color gradually changed from golden to almost colorless. After the completion of the reaction, dendritic platinum tubes were thoroughly washed using saturated NaCl and then $HNO_3$ to get rid of AgCl and Ag respectively. And the particles were finally washed with distilled water and dried to obtain pure dendritic platinum particles.

Characterization of the Silver and Platinum Particles

The morphologies, crystallinities, and chemical compositions of both the dendritic silver particles and the porous, hollow dendritic platinum tubes were determined by various techniques including a field-emission scanning electron microscope (FESEM, Hitachi S-4800, operating at 5 kV), equipped with an energy-dispersive X-ray spectrometer (EDX), a transmission electron microscope (TEM, Hitachi 7000, operating at an accelerating voltage of 100 kV), and high-resolution TEM (HRTEM, JEOL 2010F, operating at 200 kV). Powder X-ray diffraction (XRD) measurements were performed on a Bruker D8 Discover diffractometer operating at 40 kV and 40 mA, with Cu Kα radiation (λ=0.154 nm). For the time-dependent morphology evolution study, samples, taken from different reaction stages, were washed and placed on silicon wafer substrates, and then dried under ambient conditions.

Electrochemical Studies

Pt loadings in prepared electrochemical cells were confirmed by inductively coupled plasma-optical emission spectroscopy (ICP-OES).

Electrochemical properties of the catalysts were measured on an Autolab potentiostat/galvanostat (Model, PGSTAT-30, Ecochemie, Brinkman Instruments) with rotation control (MSR, Pine Instruments), using a three-electrode system that consisted of a glassy carbon (GC) rotating disk electrode (RDE), a Pt wire counter electrode, and a Ag/AgCl (3M NaCl) reference electrode which was separated from the working electrode compartment by a closed electrolyte bridge. For convenience, all potentials in this study are referenced to the reversible hydrogen electrode (RHE). Typically, the catalyst dispersions were prepared by mixing 2.5 mg of designed catalyst in 5 mL aqueous solution containing 1 mL of isopropanol and 30 μL of 5 wt % Nafion solution (4/1/0.0017 in volume ratio), followed by 12 min ultrasonication. GC disk electrodes (5 mm diameter, 0.196 $cm^2$, Pine Research Instrument) served as the substrate for the support and were polished to a mirror finish. An aliquot of catalyst suspension was pipetted onto the carbon substrate, leading to a Pt loading of about 6 $\mu g_{Pt}$ for all catalysts. The catalyst films were dried under flow $N_2$ at room temperature.

The working electrode was first cycled between 0 and 1.2 V for 50 times in an argon purged 0.5M $H_2SO_4$ solution at room temperature, in order to produce a clean electrode surface. The scan rate used was 50 mV/s. Then the cyclic voltammetry (CV) measurements were conducted by cycling the potential between 0 and 1.2 V, with sweep rate of 50 mV/s. The electrochemical surface areas (ECSA) were calculated by measuring the charge associated with the $H_{ads}(Q_H)$ between 0 and 0.4 V and assuming $Q_{ref}$=0.21 $mC/cm^2$, corresponding to a surface density of $1.3 \times 10^{15}$ Pt atoms per $cm^2$, which is generally accepted for polycrystalline Pt electrodes. The ECSA of Pt was calculated based on the following relation:

$$ECSA = Q_H/(Q_{ref} \times m)$$

where $Q_H$ is the charge for H adsorption ($mC/cm^2$), m is the Pt loading ($mg/cm^2$) in the electrode, and $Q_{ref}$ is the charge required for the monolayer adsorption of hydrogen on a Pt surface (0.21 $mC/cm^2$).

The adsorption of hydroxyl species was calculated based on the $OH_{ad}$ peak in the CV curves at the potential larger than 0.6 V. Dividing the hydroxyl adsorption area by the overall active surface area resulted in the surface coverage of $OH_{ad}$ species ($\Theta_{OHad}$). The oxygen reduction reaction (ORR) experiments were performed in oxygen saturated 0.5M $H_2SO_4$ solution at room temperature. The RDE rotating rate was 1,600 rpm and sweep rate was 10 mV/s. Current densities were normalized in reference to the geometric area of the GC RDE (0.196 cm$^2$). The CV measurements for accelerated durability test (ADT) were conducted by potential cycling between 0.6 and 1.2 V (vs. RHE) for 4,000 cycles in $O_2$ saturated 0.5 M $H_2SO_4$ at room temperature, with scan rate of 50 mV/s. Meanwhile, full-scale voltammograms between 0 and 1.2 V in $N_2$ saturated 0.5 M $H_2SO_4$ were recorded periodically to track the degradation of Pt catalysts.

Figure 3A:
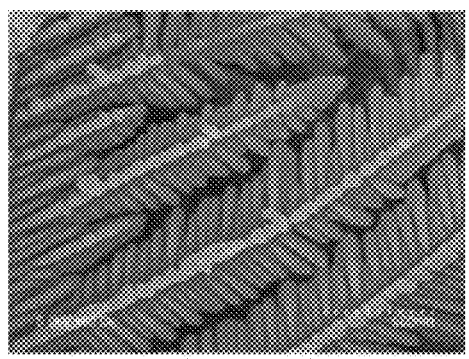
FIGS. 3A and 3B are scanning electron Microscope (SEM) images of exemplary silver, Ag, dendrites used in preparation of porous dendritic platinum nanotubes in accordance with this invention.
Figure 3B:
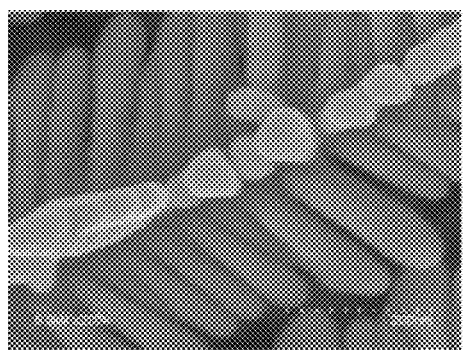
Figure 3C:
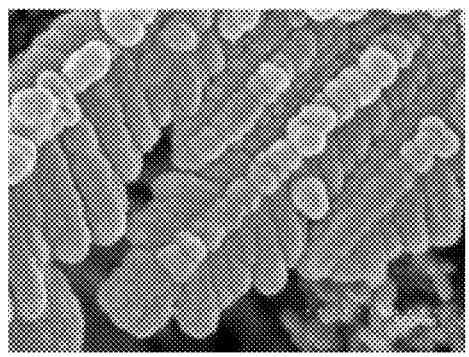
FIGS. 3C and 3D are SEM images of resulting porous dendritic platinum, Pt, nanotubes.
Figure 3D:
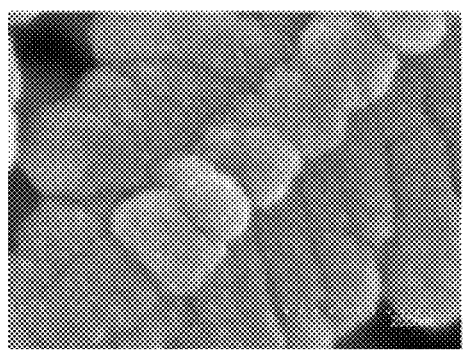

Silver dendrites as formed by the described replacement reaction between commercial magnesium powder and silver nitrate are illustrated in the SEM images of FIGS. 3A and 3B. These SEM images clearly show the dendrite (single crystal) structures with multilevel generations, having a long main trunk with short side branches (or even further sub-branches) all decorated by small leaves. Generally, the lengths of the trunks and sub-branches are several tens of micrometers and several micrometers, respectively. However, all the diameters (trunk, branch, and sub-branches), have a similar size of about 40 nm. The silver dendrites were then used as template for the synthesis of platinum dendritic tubes. The SEM images (FIGS. 3C and 3D) reveal that the platinum was formed with very similar dendrites. But the platinum dendrites had somewhat larger diameters of the leaves and branches. And the platinum dendrites of FIGS. 3C and 3D displayed porous structures that are composed of numerous assembled tiny Pt nanoparticles (size: 2~3 nm).

Figure 4A:
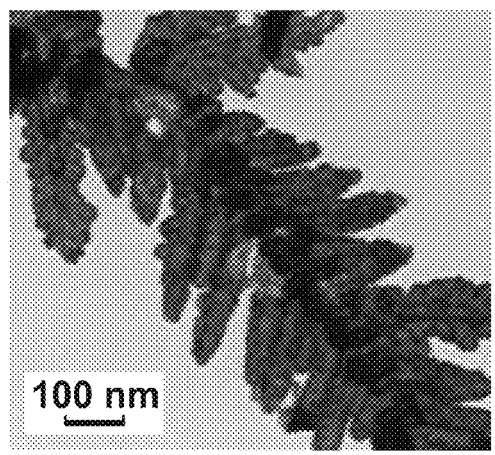
FIG. 4A is a transmission electron microscope (TEM) image of dendritic Pt tubes.
Figure 4B:
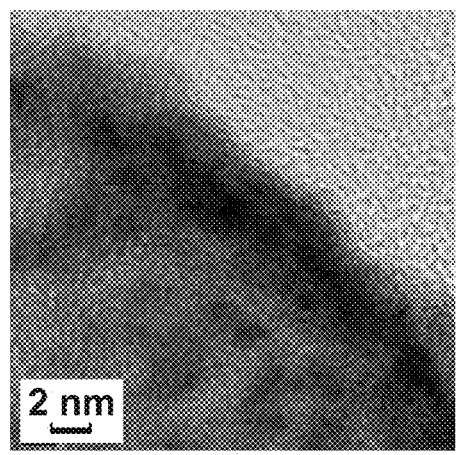
FIGS. 4B and 4C are high resolution transmission electron microscope images (HRTEM) images taken from the dense and thin wall-thickness of Pt tubes, respectively.
Figure 4C:
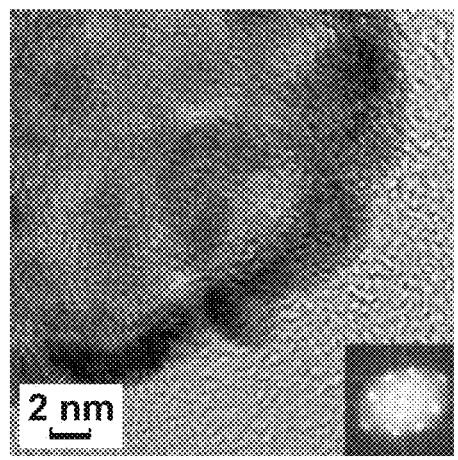
Figure 4D:
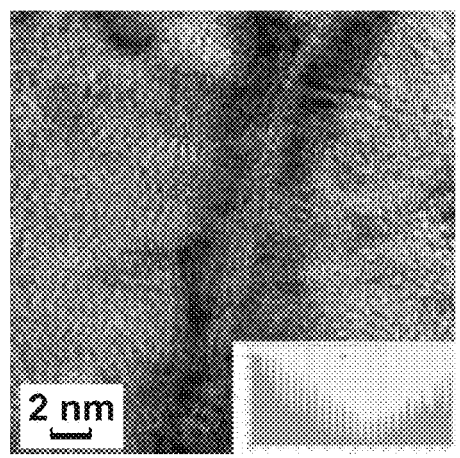
FIG. 4D is a HRTEM image of the boundary of two Pt nanotubes.

The porous, hollow Pt dendritic particles were further characterized by TEM. FIG. 4A gives a regular TEM image of a Pt dendrite, which clearly shows the porous, hollow (tubular) structure for each branch and leaf. The high-resolution TEM (HRTEM) in FIG. 4B shows that the wall-thickness is about 2~3 nm and also, this structure is indeed a porous structure composed of many tiny, joined Pt nanoparticles with a mean size of 2~3 nm. In addition, all platinum nanoparticles had substantially the same crystal alignment with <111> along the branch/leaf growth direction. The HRTEM in FIG. 4C was taken from the thin part of the dendritic leaves. It shows the much more porous structure but still with 2~3 nm wall-thickness and almost same nanoparticle orientation with growth direction along <111>. FIG. 4D was taken from the boundary of two Pt tubes. It has been observed that different platinum dendrite particles produced by the described replacement reaction still have the same crystal orientation. This phenomenon may well due to the epitaxial growth of the Pt nanoparticles templated from the single crystalline Ag dendrites. Detailed Ag structural characterization including crystallinity as well as (sub) branch- and leaf-growth directions was made. The characterization demonstrated that the Ag dendrites grow along a preferential direction <111>. Based on the very small mismatch in lattice constants between fcc Ag (4.08 Å) and fcc Pt (3.92 Å), it therefore leads to parallel growth directions. In other words, it is believed that the silver dendrites served as templates in the formation of the platinum dendrites by the galvanic replacement reaction.

Figure 5:
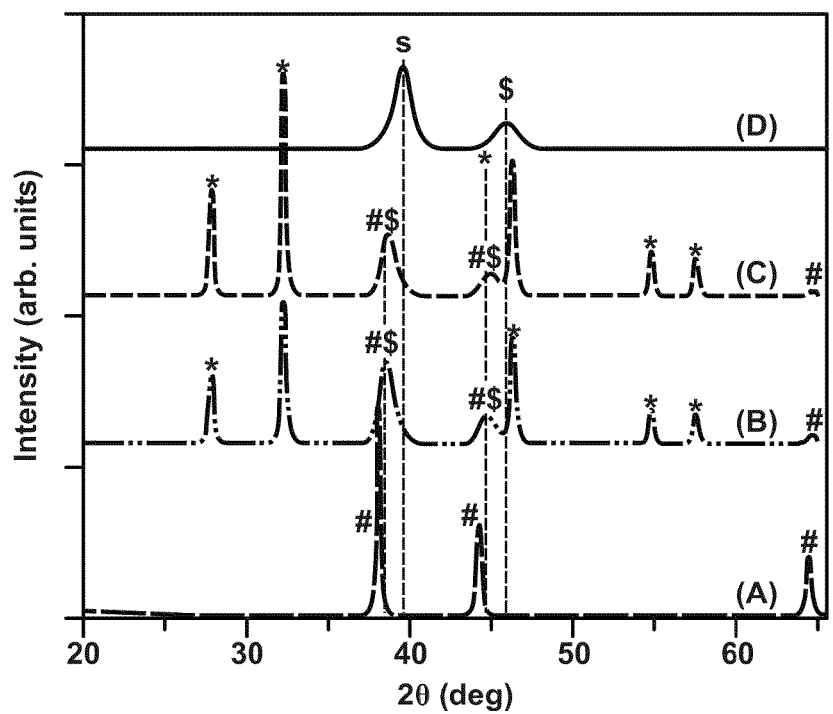
FIG. 5 presents four aligned XRD patterns (Intensity in arbitrary units versus diffraction angle, 2 theta) showing the evolution of crystal stages from Ag to pure Pt, as a function of reaction time for (A) 0 min, (B) 8 min, (C) 12 min, (D) final Pt dendrites, respectively. The pound sign (#) indicates silver diffraction peaks, the asterisk (*) indicates silver chloride diffraction peaks and the dollar sign ($) indicates the platinum peaks.

The powder X-ray diffraction (XRD) patterns (FIG. 5 in which the patterns are stacked) show evolution stages from silver dendrite particles to hollow platinum dendritic tubes, as a function of reaction time for (A) 0 min, (B) 8 min, (C) 12 min, (D) final platinum dendrites, respectively. Diffraction pattern (A) in FIG. 5 reflects the purity of Ag dendrites (JCPCDS, 04-0783), with peaks located at 38.12, 44.27 and 64.43 that can be assigned to the (111), (200) and (220) planes of Ag. After 8 min reaction [pattern (B) in FIG. 5], the Ag peaks reduced dramatically and obvious AgCl peaks appear. After 12 min [pattern (C) in FIG. 5], the reaction continued and the peak ratio of Ag to AgCl decreased. The Pt peaks [patterns (B) and (C) in FIG. 5] are not obvious which is mainly because the atomic ratio of Pt to AgCl in the product is 1:4. Further, platinum is an element with very heavy atoms. Therefore, the XRD pattern shows a very strong AgCl signal. While, when we washed the sample using saturated NaCl and HNO$_3$ to get rid of AgCl and Ag respectively, pure Pt are obtained, as shown in FIG. 5(D).

Figure 6A:
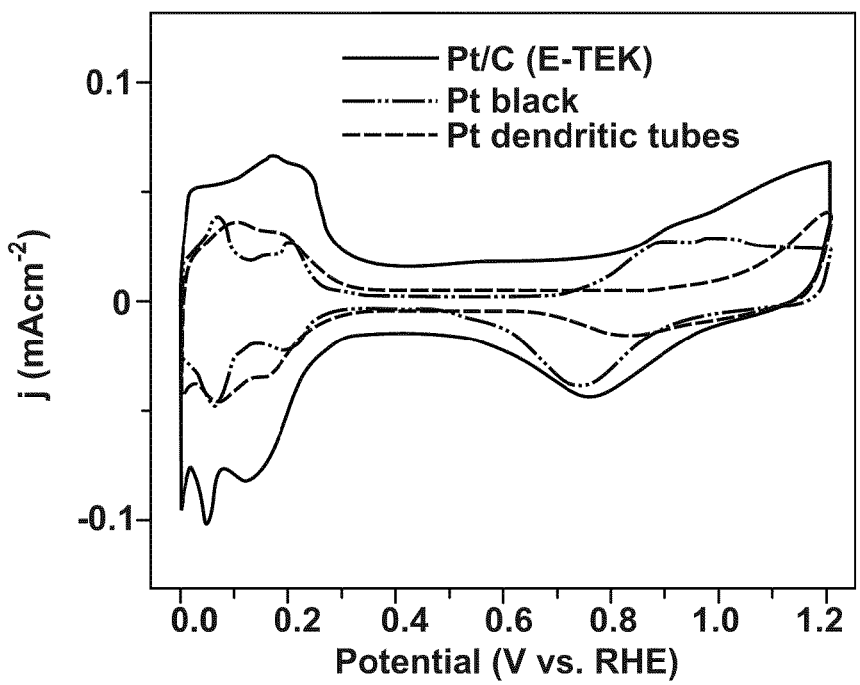
FIGS. 6A-6D are graphs of electrochemical evaluations of platinum nanosize dendrites prepared in accordance with this invention.
Figure 6B:
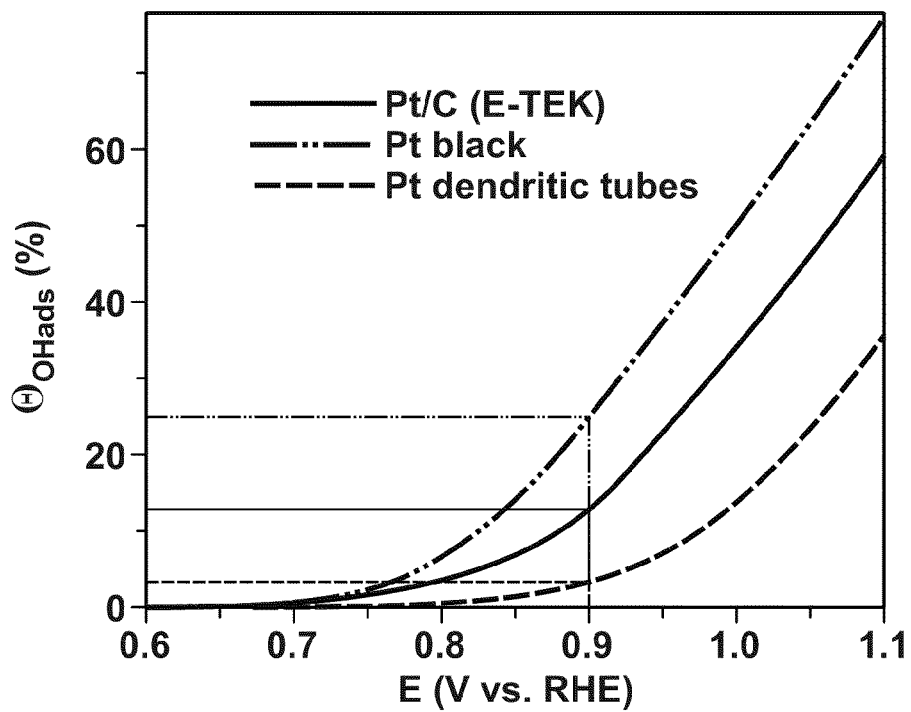

The electrochemical properties of porous, hollow platinum dendritic tubes were also compared with both a commercial Pt/C catalyst (made of Pt nanoparticles deposited on Vulcan XC-72 carbon support (E-TEK, 30 wt % Pt) and Pt black (Aldrich fuel cell grade). FIG. 6A shows the cyclic voltammetry (CV) curve comparison of these three catalysts recorded at room temperature in argon purged 0.5 M $H_2SO_4$ solution with a sweep rate of 50 mV/s. These three CV curves exhibited strong peaks associated with hydrogen adsorption/desorption and Pt oxide formation/reduction. The electrochemical surface areas (ECSA) were calculated by measuring the charge associated with the $H_{ads}$ ($Q_H$) between 0 and 0.4 V and assuming $Q_{ref}$=0.21 mC/cm$^2$ for the adsorption of a hydrogen monolayer, corresponding to a surface density of 1.3×10$^{15}$ Pt atoms per cm$^2$, which is generally accepted for polycrystalline Pt electrodes. The specific ECSA of the Pt dendritic tubes was 23.3 m$^2$/g Pt, which is 1.4 times greater than that of Pt black (16.3 m$^2$/g Pt) but nearly half (53%) of that of commercial E-TEK Pt/C catalyst (43.8 m$^2$/g Pt). Interestingly, the dimensional change of Pt nanostructures (Pt/C samples) from particle (OD) to dendritic tubes (3D) also greatly altered the ability to adsorb hydroxyl species ($OH_{ad}$, E>0.6V) (FIG. 6B). In addition, one can see that both the onset and peak potentials for the Pt dendritic tubes showed greater positive shifts compared with Pt black and E-TEK catalysts on the backward sweep, indicating the fast hydroxyl desorption from the Pt dendritic surface.

Figure 6C:
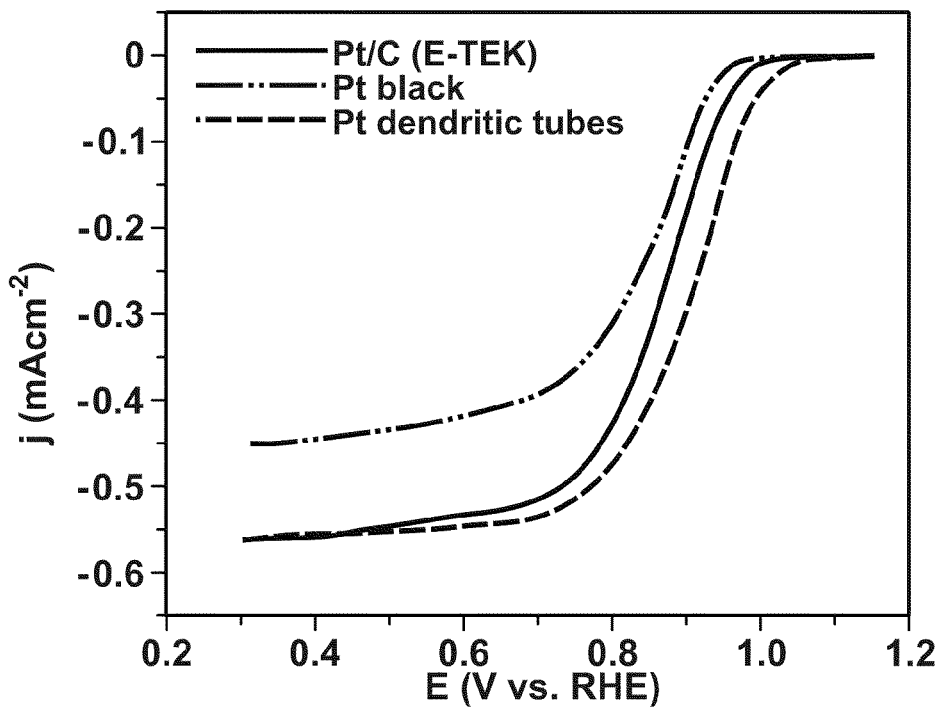
Figure 6D:
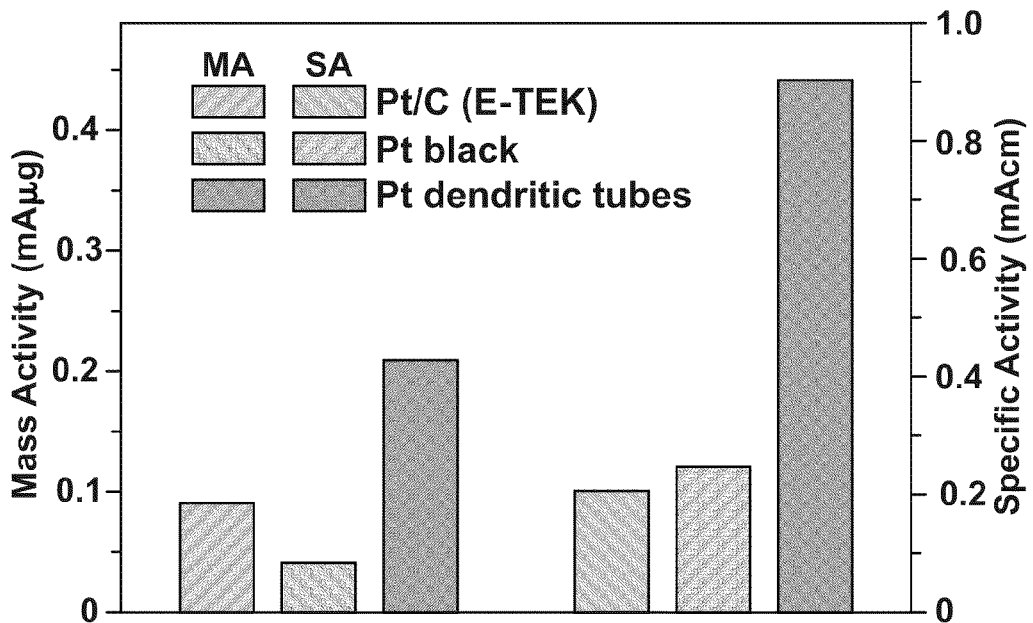

FIG. 6C shows typical ORR polarization curves of porous, hollow Pt dendritic tubes, Pt black, and Pt/C (E-TEK) catalysts obtained at room temperature in oxygen saturated 0.5 M $H_2SO_4$ by using a glassy carbon rotating disk electrode (RDE) at 1600 rpm. The half-wave potentials for the Pt dendritic tubes show greater positive shift than those for both Pt black and Pt/C catalysts, indicating that the catalytic activity of Pt dendritic tubes was higher than that of the commercial Pt/C catalyst and Pt black catalysts. Mass activity and specific activity are good indicators of the quality of an electrocatalyst. As shown in FIG. 6D, Pt dendritic particles exhibited a mass activity of 0.21 mA/μg Pt at 0.9 V (vs. RHE), which was 2.33 times greater than that of the Pt/C (E-TEK) catalyst (0.09 mA/μg Pt) and 5.25 times greater than that of the Pt black catalyst (0.04 mA/μg Pt). Interestingly, this improvement occurred in spite of about a 50% lower Pt active surface area for Pt dendritic particles catalyst. Taking into account both effects, a specific ORR activity of 0.901 mA/cm$^2$ Pt for the Pt dendritic tube was obtained at 0.9 V, which was 4.40 times that for E-TEK Pt/C catalyst (0.205 mA/cm$^2$ Pt) and 3.68 times that for Pt Black catalyst (0.245 mA/cm$^2$ Pt).

The improved activity for the Pt dendritic particles compared with nanoparticles of Pt on carbon could be due to several factors, including (1) the changes in geometry morphology (3D vs. OD) because the 3D shape could facilitate the reaction kinetics and improve the O$_2$ diffusion to the Pt surface; (2) fewer surface defects, borne by the dendritic tubes which have a closer resemblance to the surface of large single Pt crystals that exhibit even higher ORR specific activities; and (3) the preferential exposure of certain crystal facets of Pt dendritic particles since the different low-index surfaces have markedly different activities. In addition, the adsorbed $OH_{ad}$ species on the Pt surface could block the active surface for $O_2$ adsorption and thus have a negative impact on the ORR. Pt dendritic particles bear comparatively smooth atomic surfaces, which have a small number of low coordination atoms, thus they are more active than surfaces with a high concentration of such sites because of the reduced interaction with OH species. Therefore, the low $OH_{ad}$ coverage on the surface of the Pt dendritic tube catalyst helps to improve the ORR kinetics, resulting in enhanced activities.

Figure 7A:
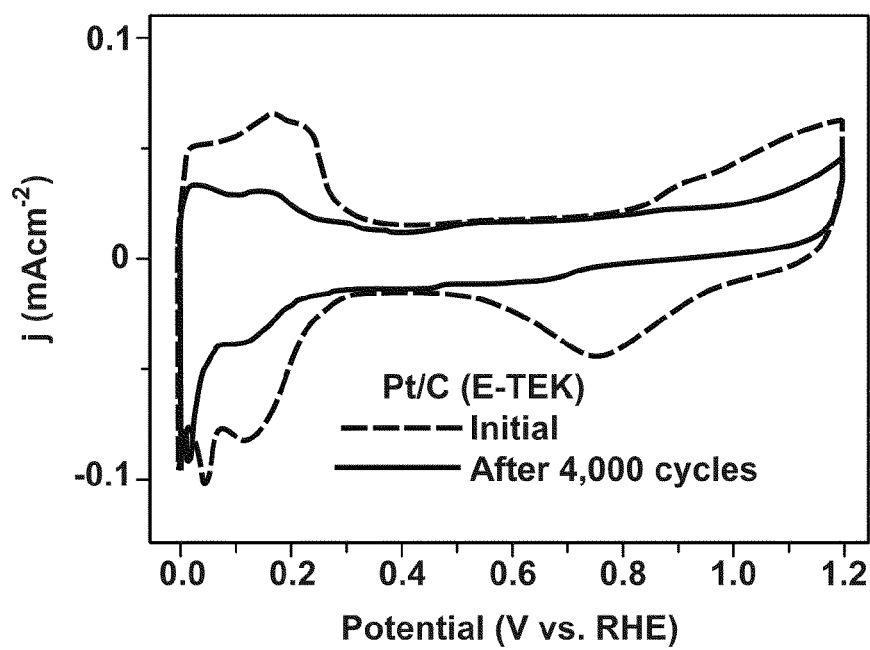
FIGS. 7A-7D are graphs of electrochemical durability evaluations.
Figure 7B:
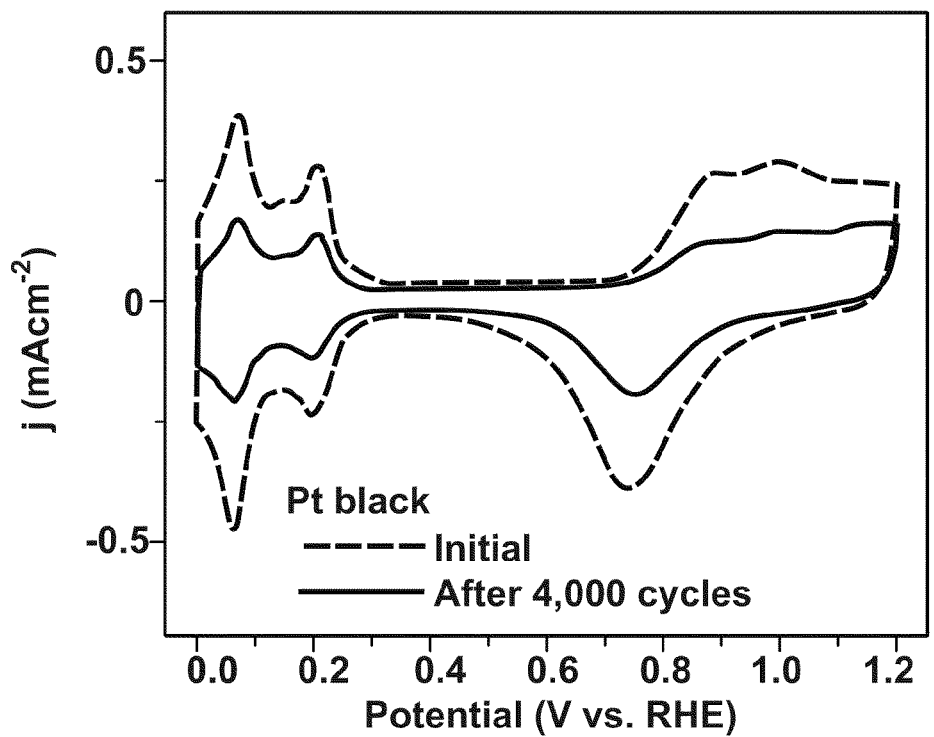
Figure 7C:
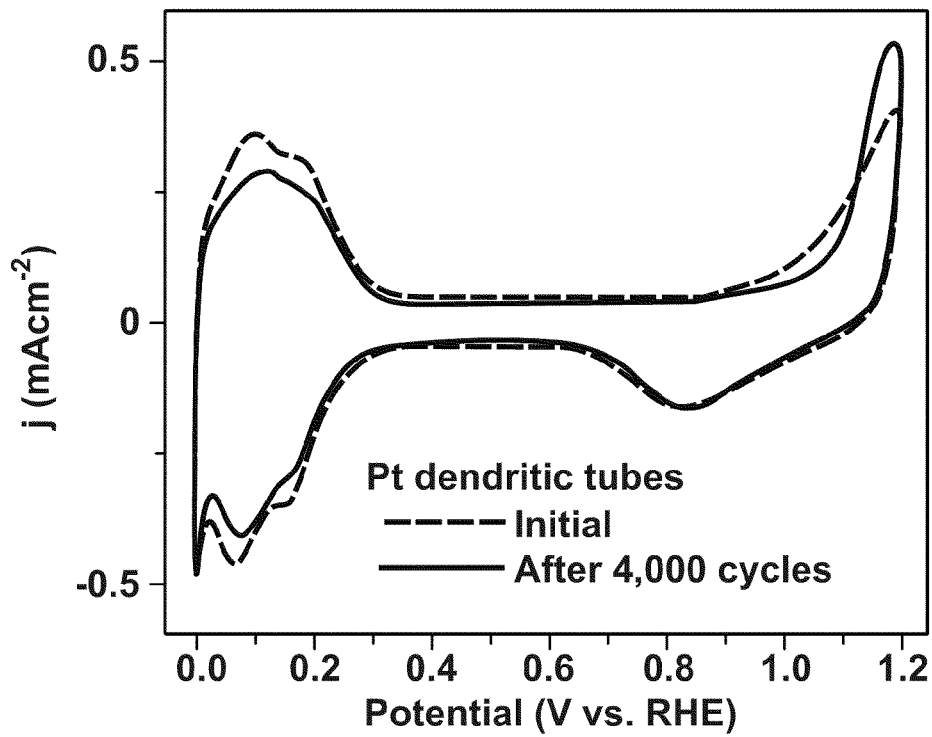
Figure 7D:
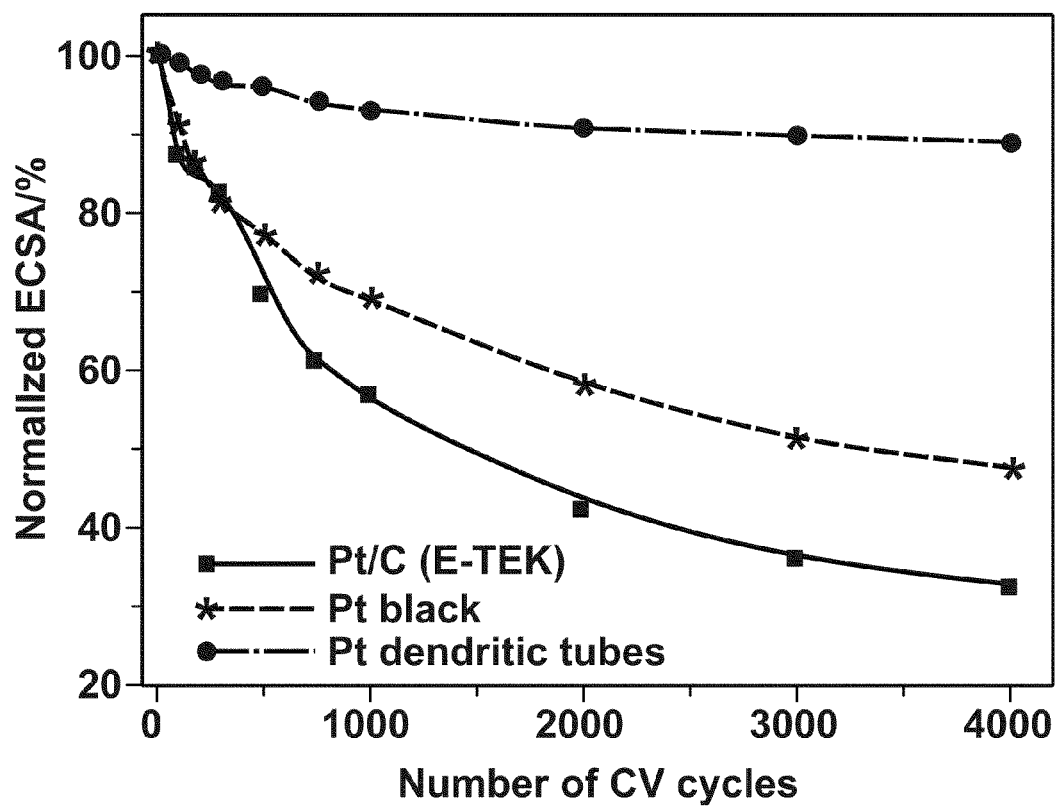

The accelerated durability tests (ADT) of the catalysts were conducted by potential cycling between 0.6 and 1.2 V vs. RHE in $O_2$ purged 0.5M $H_2SO_4$ solution at room temperature, with scan rate of 50 mV/s. After 4,000 cycles, the Pt dendritic tubes catalyst lost only 11% of the Pt initial ECSA (FIGS. 7C, 7D), while the degradation of both E-TEK Pt/C and Pt black catalysts was quite severe, with 67.5% and 52.7% losses of the initial Pt ECSA for TEK Pt/C (FIGS. 7A, 7D) and for Pt black (FIGS. 7B, 7D), respectively, after the ADT test. That is, the Pt dendritic tube catalyst was 6.1 times and 4.8 times better than that of E-TEK Pt/C and Pt black catalysts.

In summary, porous, hollow Pt dendritic particles have been successfully synthesized by a simple, cost-effective, aqueous solution method based on galvanic replacement reaction between Ag dendrites and $H_2PtCl_6$. The synthesis is green and environmentally benign as it does not require any high temperature, organic solvent, or electrochemical deposition. Compared to Pt black and Pt/C commercial catalysts, this porous Pt dendritic tubular catalyst exhibited much improved electrocatalytic activity and durability at the same Pt loading for PEM fuel cell applications.

The invention claimed is:

1. A method of making porous, dendritic, elemental platinum tubes, the method comprising:
    forming an aqueous solution of platinum cations, the solution being formed with an amount of the platinum cations and at a temperature;
    adding dendritic particles of an elemental second metal to the solution, the dendritic particles of the elemental second metal having a greater reduction potential than the platinum cations, the amount of platinum cations being such that dendritic particles of the elemental second metal are dissolved and a portion of the amount of platinum cations are precipitated as porous, hollow, dendritic tubes of elemental platinum; the temperature of the solution, the amount of platinum cations, and the selection of the second elemental metal producing the porous dendritic platinum tubes;
    and separating the porous dendritic platinum tubes from the solution.

2. A method of making porous dendritic platinum tubes as recited in claim 1 in which elemental silver dendritic particles are the only particles of a second metal added to and reacted with the aqueous solution of platinum cations.

3. A method of making porous dendritic platinum tubes as recited in claim 1 in which the mixture of the solution of platinum cations and added particles of the second elemental metal is not heated above the ambient temperature.

4. A method of making porous dendritic platinum tubes as recited in claim 1 in which the dendritic particles of an elemental second metal are added to an aqueous solution consisting essentially of cations of platinum produced from dissolved $H_2PtCl_6$.

5. A method of making porous dendritic platinum tubes as recited in claim 2 in which the dendritic particles of silver were formed from an aqueous solution of silver anions ($Ag^+$) by a replacement reaction with substantially pure powder of an elemental metal selected from the group consisting of aluminum, magnesium, manganese, and zinc.

6. A method of making porous dendritic platinum tubes as recited in claim 1 in which dendritic particles of elemental silver formed by a replacement reaction with magnesium are mixed with an aqueous solution of $H_2PtCl_6$.

7. A method of making porous dendritic platinum tubes as recited in claim 1 in which the dendritic elemental platinum tubes are characterized by a hollow central trunk with shorter hollow side branches and leaves.

8. A method of making porous dendritic platinum tubes as recited in claim 7 in which the diameters of the trunks and branches are about forty to fifty nanometers.

* * * * *